United States Patent [19]

Spoltman et al.

[11] Patent Number: 4,810,167

[45] Date of Patent: Mar. 7, 1989

[54] COMPOSITE AIRCRAFT PROPELLER BLADE

[75] Inventors: Mark W. Spoltman; Richard D. Bowerman; Richard L. Edinger, all of Piqua, Ohio

[73] Assignee: Hartzell Propeller Inc., Piqua, Ohio

[21] Appl. No.: 939,426

[22] Filed: Dec. 8, 1986

[51] Int. Cl.[4] ............................................. B32B 5/16
[52] U.S. Cl. ................................ 416/229 A; 416/230; 416/241 A
[58] Field of Search ........... 416/229 R, 229 A, 230 R, 416/239, 241 A, 248; 29/156.8 B

[56] References Cited

U.S. PATENT DOCUMENTS

| | | | |
|---|---|---|---|
| 2,775,426 | 12/1956 | Barrett et al. | 416/229 A |
| 3,752,600 | 8/1973 | Walsh et al. | 416/219 |
| 3,883,267 | 5/1975 | Baudier et al. | 416/241 A |
| 4,037,990 | 7/1977 | Harris | 416/241 A |
| 4,111,606 | 9/1978 | Prewo | 416/224 |
| 4,268,571 | 5/1981 | McCarthy | 416/229 A |
| 4,407,635 | 10/1983 | Grimes et al. | 416/230 |
| 4,524,499 | 6/1985 | Grimes et al. | 29/156.8 B |

Primary Examiner—Larry I. Schwatz
Attorney, Agent, or Firm—Jacox & Meckstroth

[57] ABSTRACT

A generally flat core of foam material extends outwardly from a wedge-shaped metal base plug, and the core is covered with overlapping plies of resin-bonded plastics materials having unidirectional fibers. The plies are covered by outer layers or skins of resin-bonded woven fabric plastics materials. The fibers of the inner plies are orientated at positive and negative acute angles relative to the longitudinal axis of the blade to provide the blade with predetermined torsional stiffness, and the fibers of the outer plies extend generally parallel to the axis and wrap around the base plug in an interleaving manner to provide high stiffness and strength to bending forces. Some of the plies extending around the base plug receive metal shell elements, and the shell elements engage propeller hub lip portions which cooperate to define an under-cut recess and clamp the plies to the base plug.

31 Claims, 3 Drawing Sheets

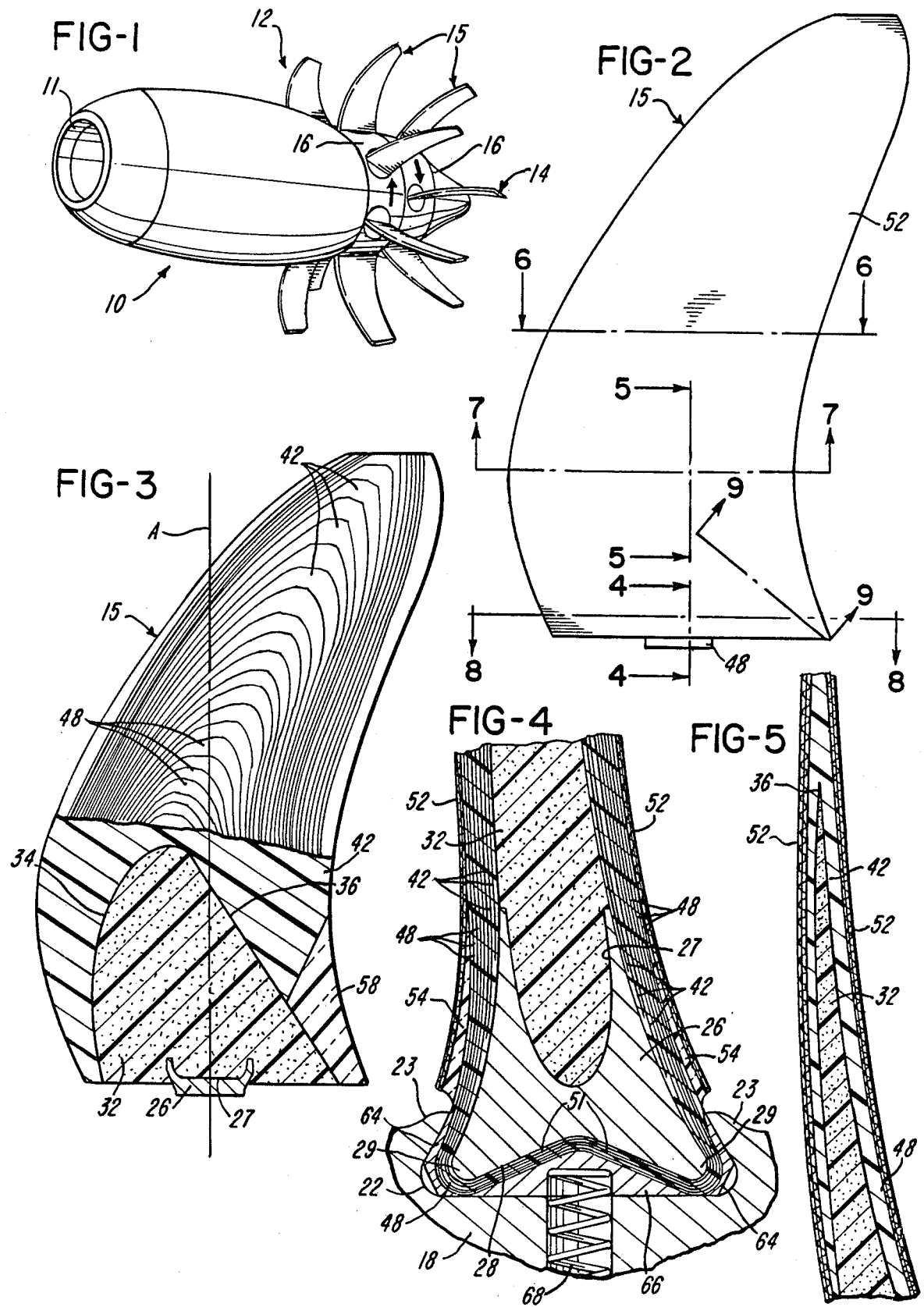

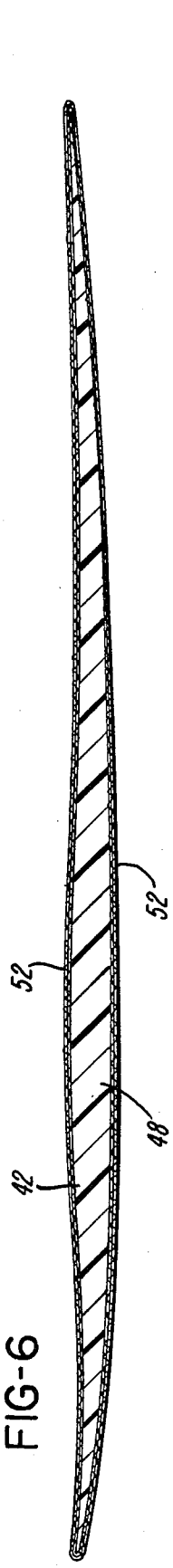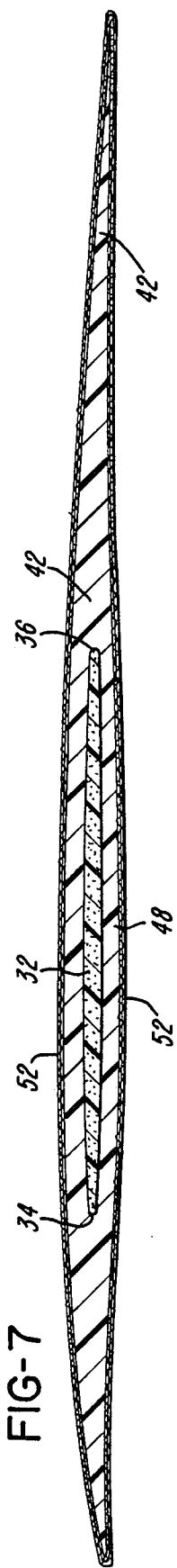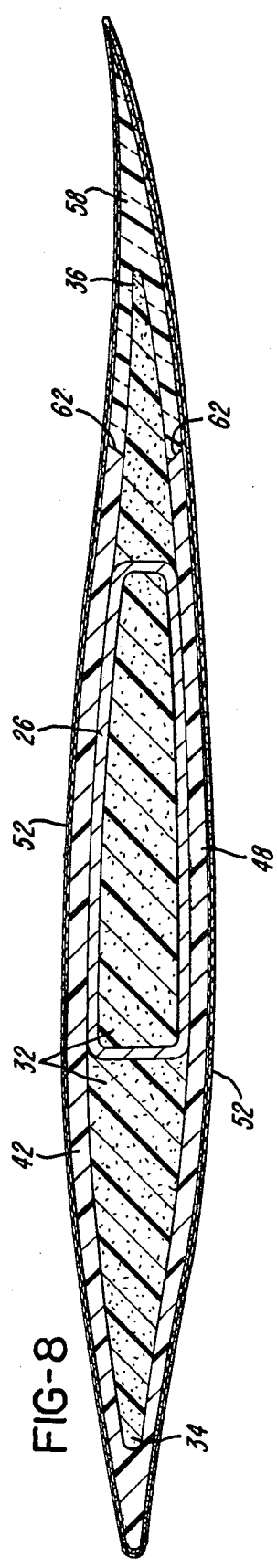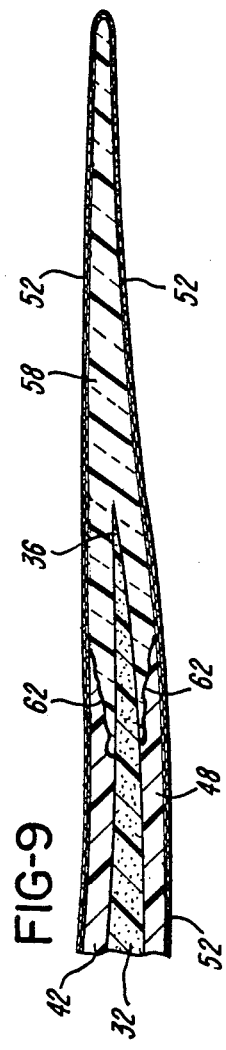
FIG-6
FIG-7
FIG-8
FIG-9

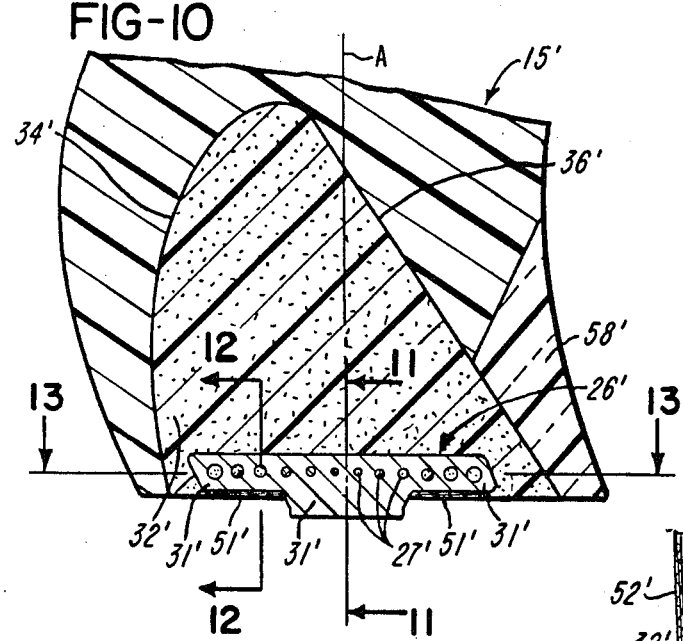
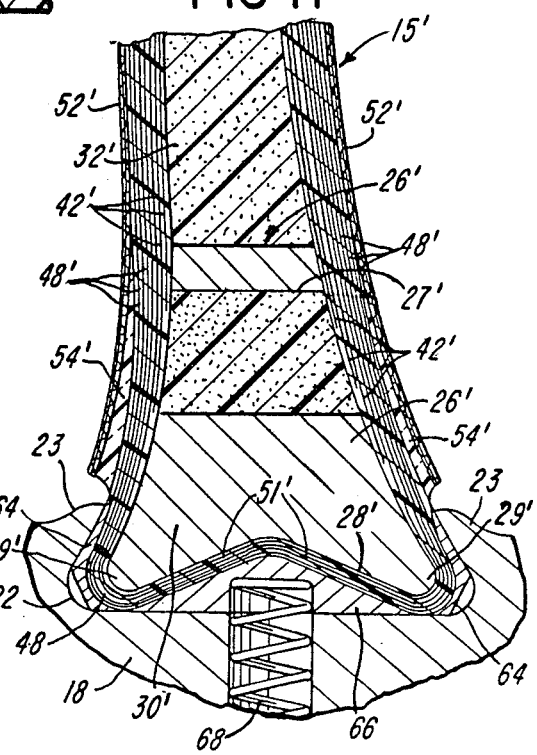
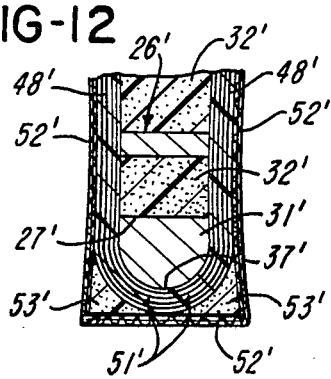
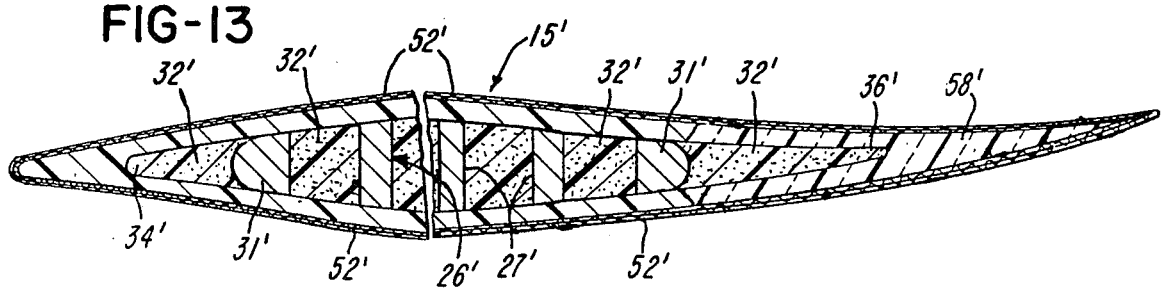

COMPOSITE AIRCRAFT PROPELLER BLADE

BACKGROUND OF THE INVENTION

The present invention relates to composite aircraft propeller blades, for example, of the general type disclosed in U.S. Pat. Nos. 4,407,635 and 4,524,499 assigned to the assignee of the present invention. The composite blade of the invention may be attached to a propeller hub component having an undercut or generally dove-tail shaped recess for receiving a root or base portion of the blade. The blade is ideally suited for use on a "propfan" aircraft which is powered by turbine engines each having counterrotating shafts which support and drive multiple blade fans or propellers. The blades for this type of engine have a substantial width to thickness ratio, and the width of each blade at its base is substantially greater than the rotatable hub component which retains the blade and changes the pitch of the blade.

It is important for each of the wide blades to be constructed with a predetermined bending stiffness and torsional stiffness to provide the desired strength while also avoiding flutter of the outer or tip portion of the blade. The blade should also provide for a smooth transfer of centrifugal and bending loads or forces resulting from propeller thrust and engine torque to the hub structure which retains and supports the blade and changes the pitch of the blade. Other forms of composite blades and their mounting structure are disclosed in U.S. Pat. Nos. 3,752,600 and 4,111,606.

SUMMARY OF THE INVENTION

The present invention is directed to an improved composite aircraft propeller blade and its method of construction, and which is ideally suited for use with a propfan aircraft turbine engine having counterrotating shafts driving tandem fans or propellers. The composite blade of the invention is constructed to be economically molded in one operation and provides for a smooth transfer of centrifugal and bending loads from the blade to the blade retaining and support structure on the propeller hub. In addition, the composite blade of the invention provides substantial torsional stiffness to avoid flutter or torsional deflections within the tip portion of the blade and provides substantial axial strength in the root or base portion of the blade to withstand the loads due to propeller thrust and engine torque. The outer surface of the blade is formed by a composite material which increases torsional stiffness and improves shear transfer between the composite plies forming the blade in addition to providing surface durability.

In accordance with one embodiment of the invention, the above features and advantages are provided by a blade having a generally flat tapered core of foam material which extends outwardly from a wedge-shaped metal base plug. The wide core is covered with overlapping plies of resin-bonded plastics or composite materials having unidirectional reinforcing fibers, and the plies are covered by outer layers of resin-bonded woven fabric plastics or composite materials. The fibers of the inner plies are orientated at acute angles relative to the longitudinal axis of the blade, and the fibers of the outer plies extend generally parallel to the axis and wrap around the base plug in an interleaving alternating manner. The outer plies extending around a support portion of the base plug receive metal shells which engage lip portions of a rotatable blade retaining member forming part of the propeller hub. In another embodiment, the base plug has horn portions projecting in opposite directions from the support portion, and the outer plies also extend around the horn portions.

Other features and advantages of the invention will be apparent from the following description, the accompanying drawings and the appended claims.

BRIEF DESCRIPTION OF THE DRAWINGS

FIG. 1 is a perspective view of a turbine engine for a propfan aircraft and having counterrotating shafts for driving corresponding propellers or fans each having a set of composite blades constructed in accordance with the invention;

FIG. 2 is an enlarged side elevational view of one of the composite blades shown in FIG. 1;

FIG. 3 is a partial section taken generally through the longitudinal axis of the composite blade shown in FIG. 2 and showing the outer portion with the skin layers removed;

FIG. 4 is an enlarged fragmentary section taken generally on the line 4—4 of FIG. 2;

FIG. 5 is an enlarged fragmentary section taken generally on the line 5—5 of FIG. 2;

FIGS. 6-9 are enlarged fragmentary sections taken generally on the line 6—6, 7—7, 8—8 and 9—9 of FIG. 2;

FIG. 10 is a fragmentary section similar to FIG. 3 and showing a composite blade constructed in accordance with a modification of the invention; and FIGS. 11-13 are enlarged fragmentary sections of the modified blade and taken generally along the lines 11—11, 12—12 and 13—13 of FIG. 10.

DESCRIPTION OF THE PREFERRED EMBODIMENTS

FIG. 1 illustrates a gas turbine engine 10 having a front air intake 11 and rearwardly projecting counterrotating concentric shafts (not shown) supporting corresponding fans or propellers 12 and 14 each including a set of eight composite propeller blades 15 constructed in accordance with the present invention. As illustrated, the fan or propeller 12 rotates in a counterclockwise direction, and the fan or propeller 14 rotates in a clockwise direction. Each of the fans or propellers includes a generally cylindrical hub assembly 16 which forms no part of the present invention.

Each of the composite propeller blades 15 is constructed as shown in FIGS. 2-9 and in accordance with the description which follows. Each blade 15 is supported by a hub member 18 (FIG. 4) which is rotatable on a radial axis relative to the propeller hub assembly 16 (FIG. 1) for adjusting the pitch of the blade. Each of the hub members 18 defines a dove-tailed or undercut slot or recess 22 which is partially formed by opposing parallel retention lips 23. The root or base portion of each blade 15 is retained within a corresponding recess 22 in a manner as will be described in reference to FIG. 4. The base portion of each blade includes a wedge-shaped base or shank plug 26 which has an elongated cavity 27 having a U-shaped cross-sectional configuration. The bottom surface 28 of the plug 26 is V-shaped in cross-sectional configuration and connects rounded corner portions 29.

A generally flat tapered core 32 of expanded rigid urethane foam material is bonded to the leading and trailing portions of the plug 26 and extends into the cavity 27 within the plug, as shown in FIGS. 3 and 4. The core 32 has a curved leading edge 34 and a relatively straight trailing edge 36. Opposite side surfaces of the core 32 converge together and are covered by a series of many layers or plies of composite unidirectional materials. Each ply comprises a mat of parallel graphite fibers impregnated with an epoxy resin to form a high modulus composite material. A group of inner plies 42 extends from the outer tip of the blade in a shingle-like manner, as shown in FIG. 3, and have inner edges terminating in a feathered or shingle-like manner adjacent the outer surfaces of the base plug 26, as shown in FIG. 4. These inner plies 42 have unidirectional or parallel fibers 46 which form acute angles with the longitudinal axis A of the propeller blade. Preferably, the angles vary between zero and fifty degrees from the axis A and provide the outer portion of the blade with substantial torsional stiffness to reduce deflections and thereby prevent fluttering of the tip portion of the blade.

A group of outer lies 48 have unidirectional graphite fibers bonded together by epoxy resin, and the parallel fibers of the outer plies 48 extend generally parallel to the longitudinal blade axis A. These outer plies provide the inner or root portion of the blade with high axial strength to withstand the bending loads due to propeller thrust and engine torque. As shown in FIG. 4, the outer plies 48 extend or continue inwardly around the corner portions 29 of the shank plug 26 and then laterally inwardly under the bottom surface 28 of the shank plug 26 where the edge portions 51 of the outer plies are arranged in an alternating interleaving manner with the epoxy resin bonding the plies together and to the bottom surface 28 of the plug 26.

Referring to FIGS. 5-8, the inner plies 42 on opposite sides of the core 32 are bonded directly together around the core 32 and to the outer edges of the blade. The core 32 tapers so that it becomes progressively thinner toward its outer edges 34 and 36. As also shown in FIGS. 4-8, the outer plies 48 are covered by multiple layers of cover plies or skins 52 which are formed by epoxy resin impregnated woven fabric made of graphite fibers. In the root or base portion of the blade, the skins 52 are spaced from the outer composite plies 48 by a tapered layer 54 (FIG. 4) of a low modulus material such as fiberglass and resin so that the overall thickness of the composite shell, formed by the plies 42 and 48 and the skins 52, remains substantially uniform on opposite sides of the shank plug 26.

As shown in FIG. 3, the blade 15 is substantially wider than the shank plug 26 which cooperates to secure the blade to the hub member 18. It is important to provide for a smooth and uniform transfer of the loads or forces from the trailing lower edge portion of the blade to the supporting hub member 18 in order to minimize the shear forces perpendicular to the blade axis A in the retention zone or area. For this function, a layer 58 of low modulus material (FIGS. 3, 8 and 9) is used in the inner trailing corner portion of the blade. This low modulus material comprises an epoxy resin impregnated fiberglass material, and the inner edge portions of the material are feather-edged into the inner and outer plies 42 and 48 of the high modulus material in the transition zones 62 shown in FIG. 9.

Referring to FIG. 4, after the outer composite plies 48 are wrapped around the corner portions 29 of the shank plug 26 and are alternately interfitted or interleaved adjacent the bottom surface 28 of the plug 26, and after the layers of material 54 and skins 52 are bonded to the outer plies 48, the base portion of the blade is machined to remove the portions of the skins 52 and the layer 54 overlying the outer plies 48 around the shank plug 26. The machining operation also provides the outer plies 48 with a precision surface around the corner portions 29 of the shank plug 26.

A set of metal shank strips or shells 64, having a slight V-shaped configuration, are bonded with epoxy resin to the outer plies 48 extending around the edge portions 29. The metal shells 64 are positioned to mate with and engage the undercut surfaces defined by the retention lips 23 of the hub member 18. A metal shank cap or wedge 66, having a generally triangular cross-sectional configuration, is bonded by epoxy resin to the machined bottom surface formed by the interleaved edge portions 51 of the outer plies 48, and preloading spring means or compression springs 68 are retained by the hub member 18 and pressed radially outwardly on the shank wedge 66 to hold the shells 64 into engagement with the lip portions 23.

FIGS. 10-13 show a composite blade 15' which is constructed in accordance with a modification of the invention. In this embodiment, most of the reference numbers are the same as used above in connection with the composite blade 15, but with the addition of prime marks after the reference numbers for corresponding structure. The modification or embodiment of FIGS. 10-13 includes a shank or base plug 26' which is preferably formed of a metal such as titanium. The base plug 26' includes a center or intermediate portion 30' from which a pair of horn portions 31' project in opposite directions toward the leading and trailing edges of the blade 15'. The intermediate portion 30' and horn portions 31' are provided with a row of longitudinally spaced cavities or holes 27' which function to reduce the weight of the base plug 26' in the same manner as the cavity 27 reduces the weight of the base plug 26 described above. The holes 27' receive the foam core material 32' to provide a pressure back-up or resistance to the plies 42' and 48' during the molding operation.

The intermediate portion 30' of the base plug 26' has an inner surface 28' with a V-shaped configuration in the same manner as the base plug 26 has the inner surface 28. In addition, the horn portions 31' of the base plug 26' have rounded inner surfaces 37' around which the outer plies 48' are wrapped, as shown in FIG. 12. Preferably, the inner edge portions of the outer plies 48' are interleaved around the inner surfaces 37' of the horn portions in the same manner as the edge portions 51' of the outer plies 48' are interleaved adjacent the inner surface 28' of the intermediate portion 30'. As also shown in FIG. 12, the resin and cover plies or skins 52' form generally square corner portions 53' adjacent the interleaved edge portions 51' of the outer plies 48' extending around the horn portions 31'.

From the drawings and the above description, it is apparent that a composite propeller blade constructed in accordance with the invention, provides desirable features and advantages. For example, the blade construction and retention structure provide for a smooth transfer of centrifugal and bending loads or forces from the blade through the shank or base plug 26 or 26' to the hub retention member 18. It is also apparent from FIGS. 4 and 11 that the centrifugal and bending loads acting on the blade result in producing forces which compress the outer plies 48 or 48' between the retention lips 23 and the corner portions 29 or 29' of the shank plug 26 or 26' so that the outer plies are positively clamped and retained. In addition, the horn portions 31' of the base plug 26' and the wrap around plies 48' provide for an alternate load path from the plies and skins of the blade 15' to the hub member 18 through the base plug 26'.

As another advantage, the angular orientation of the undirectional fibers within the inner plies 42 relative to the axis A, provides the relatively thin outer end portion of the blade with substantial torsional stiffness to avoid fluttering of the tip portion of the blade. By varying the angles of the unidirectional fibers within the plies, the overall structural stiffness of the blade can be precisely tailored to provide the desired bending and torsional stiffness. In addition, the orientation of the unidirectional fibers within the outer plies 48 substantially parallel to the axis A, provides the blade with substantial bending stiffness so that the root portion of the blade has substantial strength in an axial direction to withstand the bending loads due to propeller thrust and engine torque.

An additional advantage is provided by the use of a low modulus composite material 54 or 54' within the root portion of the blade outboard of the shank plug 26 or 26'. Since only the skins and low modulus material are machined away on opposite sides of the plug to form the precision surfaces on the base of the blade, the outer plies remain intact to carry the loads. This also results in minimizing the shear forces between the fibers within the outer plies. Furthermore, by alternating the outer plies at the bottom of the shank plug, a large shear area is created so that the composite material acts as a continuous body to form a positive retention system. The low modulus material 58 or 58' within the trailing inner portion of the blade is also effective to reduce shear in this area and to provide for a smooth transfer of loads across the base plug to the hub retention member 18. The propeller blade 15 or 15', as described above, is also adapted to be molded in one operation within a mold. This helps to minimize production time and costs and provides for a more econominical composite propeller blade.

While the composite propeller blades and their method of construction herein described constitute preferred embodiments of the invention, it is to be understood that the invention is not limited to the precise blade structures and methods described, and that changes may be made therein without departing from the scope and spirit of the invention as defined in the appended claims.

The invention having thus been described, the following is claimed:

1. A composite aircraft propeller blade adapted to provide for a smooth transfer of centrifugal and bending forces to a propeller hub member, said propeller blade comprising a rigid base retention plug having a radially inner end surface, a core of spacer material extending outwardly from said base plug and having opposite side surfaces converging together, a series of overlapping plies of resin-bonded fibrous plastics material overlying each of said side surfaces of said core, each of said plies including substantially parallel reinforcing fibers, a resin-bonded outer covering on said overlapping plies and forming the outer surface of said blade, said resin-bonded overlapping plies and outer covering forming leading and trailing blade edge portions projecting substantially forwardly and rearwardly from said base plug, a first portion of said plies and corresponding reinforcing fibers on both of said side surfaces of said core extending inwardly around said inner end surface of said base plug and being bonded to said inner end surface, and means for securing said base plug to the hub member.

2. A propeller blade as defined in claim 1 wherein said base plug has a generally wedge-shaped cross-sectional configuration with said inner surface disposed within a generally dovetail-shape recess within the hub member, and said first portion of said plies extend adjacent said inner surface within the recess.

3. A propeller blade as defined in claim 1 wherein said base plug includes horn portions projecting into said portions of said blade from an intermediate portion, and said horn portions cooperate to form said inner surface receiving said first portion of said plies.

4. A propeller blade as defined in claim 3 wherein said intermediate portion of said base plug extends into a recess within the hub member, and said intermediate portion cooperates to form said inner surface receiving said first portion of said plies.

5. A propeller blade as defined in claim 1 wherein said fiber of said first portion of said plies extend generally parallel to a longitudinal axis of said blade to provide said blade with substantial bending stiffness relative to the hub member.

6. A propeller blade as defined in claim 5 wherein a second portion of said plies comprises substantially parallel fibers orientated at an angle with respect to said longitudinal axis to provide the blade with substantial torsional stiffness relative to the hub member.

7. A propeller blade as defined in claim 6 wherein said fibers in said second portion of said plies extend at both positive and negative angles with respect to said longitudinal axis.

8. A propeller blade as defined in claim 6 wherein said first portion of said plies overlie said second portion of said plies.

9. A propeller blade as defined in claim 1 wherein said base plug defines a cavity, and said spacer material forming said core extends into said cavity.

10. A propeller blade as defined in claim 1 and including a low modulus material forming one of said inner edge portions of said blade to provide for a generally uniform and smooth transfer of forces from said trailing inner edge portion through said base plug to said hub member.

11. A propeller blade as defined in claim 1 wherein said first portion of said plies extending around said base plug are interleaved in an alternating manner adjacent said inner surface of said base plug.

12. A propeller blade as defined in claim 1 wherein said inner surface of said base plug is generally concaved and defines a cavity receiving said first portion of said plies, and a wedge-shaped shank member projecting into said cavity in conforming relation and bonded to said first portion of said plies.

13. A propeller blade as defined in claim 1 wherein said first portion of said plies extending around said inner surface of said base plug form a precision base surface, and a set of metal corner shells bonded to said base surface.

14. A propeller blade as defined in claim 1 wherein said core of spacer material extends outwardly from said base plug by a distance less than one half of the overall length of said propeller blade.

15. A propeller blade as defined in claim 13 wherein the hub member has opposing retention lips defining an undercut recess, said base plug has a wedge-shaped inner portion forming said inner surface, and said wedge-shaped inner portion cooperates with said corner shells and the retention lips to compress said first portion of said plies therebetween.

16. A composite aircraft propeller blade adapted to provide for a smooth transfer of centrifugal and bending forces to a propeller hub member defining an undercut recess for receiving a base portion of the blade, said propeller blade comprising a rigid base retention plug having a radially inner end surface, a core of spacer material extending outwardly from said base plug and having opposite side surfaces converging together, a series of overlapping plies of resin-bonded fibrous plastics material overlying each of said side surfaces of said core, each of said plies including substantially parallel reinforcing fibers, a resin-bonded outer covering on said overlapping plies and forming the outer surface of said blade, said resin-bonded overlapping plies and outer covering forming leading and trailing blade edge portions projecting substantially forwardly and rearwardly from said base plug, a first portion of said plies and corresponding said reinforcing fibers on both of said side surfaces of said core including inner edge portions extending inwardly around said base plug and overlying said inner end surface of said base plug, said edge portions of said plies extending from one side of said core being interleaved with said edge portions of said plies extending from the other side of said core and being bonded to said inner end surface, and means for securing said base plug within the recess of the hub member.

17. A propeller blade as defined in claim 16 wherein said fibers of said first portion of said plies extend generally parallel to a longitudinal axis of said blade to provide said blade with substantial bending stiffness relative to the hub member.

18. A propeller blade as defined in claim 17 wherein a second portion of said plies comprises substantially parallel fibers orientated at both positive and negative angles with respect to said longitudinal axis to provide the blade with substantial torsional stiffness relative to the hub member, and said first portion of said plies overlie said second portion of said plies.

19. A propeller blade as defined in claim 16 and including a low modulus material forming one of said inner edge portions of said blade to provide for a generally uniform and smooth transfer of forces from said one inner edge portion through said base plug to said hub member.

20. A propeller blade as defined in claim 16 wherein said inner end surface of said base plug is generally concaved and defines a cavity receiving said edge portions of said plies arranged in an interleaving manner, and a wedge-shaped shank member projecting into said cavity in conforming relation and bonded to said edge portions of said plies.

21. A propeller blade as defined in claim 16 and including a set of metal corner shells bonded to said edge portions of said plies extending around said base plug.

22. A propeller blade as defined in claim 21 wherein the hub member has opposing retention lips defining an undercut said recess, and said base plug has rounded corner portions cooperating with said corner shells and the retention lips to compress said first portion of said plies therebetween.

23. A propeller blade as defined in claim 16 wherein said base plug includes horn portions projecting into said portions of said blade from an intermediate portion, said intermediate portion projects into the recess and forms said inner end surface, and said first portion of said plies also extend around each of said horn portions of said base plug.

24. A composite aircraft propeller blade adapted to provide for a smooth transfer of centrifugal and bending forces to a propeller hub member, said propeller blade comprising a rigid base retention plug having an inner end surface, a core of spacer material extending outwardly from said base plug and having opposite side surfaces converging together, a series of overlapping plies of resin-bonded fibrous plastics material overlying each of said side surfaces of said core, each of said plies including substantially parallel reinforcing fibers, a resin-bonded outer covering on said overlapping plies and forming the outer surface of said blade, said resin-bonded overlapping plies and outer covering forming leading and trailing blade edge portions projecting substantially forwardly and rearwardly from said base plug, a first portion of said plies on both of said side surfaces of said core having said fibers orientated at substantial angles with respect to a longitudinal axis of said blade to provide said blade with substantial torsional stiffness relative to the hub member, a second portion of said plies overlying said first portion of said plies on both of said side surfaces of said core and having said fibers orientated generally parallel with respect to said longitudinal axis to provide the blade with substantial bending stiffness relative to the hub member, said second portion of said plies and corresponding said fibers having inner portions extending inwardly around said base plug and overlying said inner end surface of said base plug and being bonded to said inner end surface, and means for securing said base plug to the hub member.

25. A propeller blade as defined in claim 24 wherein said fibers in said first portion of said plies extend at both positive and negative angles with respect to said longitudinal axis.

26. A propeller blade as defined in claim 24 wherein said base plug defines an elongated cavity having a U-shaped cross-sectional configuration, and said spacer material forming said core extends into said cavity.

27. A propeller blade as defined in claim 24 and including a low modulus material forming said trailing inner edge portion of said blade to provide for a generally uniform and smooth transfer of forces from said trailing inner edge portion through said base plug to said hub member.

28. A propeller blade as defined in claim 24 wherein said second portion of said plies extending around said base plug are interleaved in an alternating manner adjacent said inner surface of said base plug.

29. A propeller blade as defined in claim 24 wherein said inner surface of said base plug is generally concaved and defines a cavity receiving said second portion of said plies, and a wedge-shaped shank member projecting into said cavity in conforming relation and bonded to said second portion of said plies.

30. A propeller blade as defined in claim 24 wherein said second portion of said plies extending around said base plug and overlying said inner surface form a precision base surface, and a set of metal corner shells bonded to said base surface.

31. A propeller blade as defined in claim 24 wherein said base plug includes horn portions projecting into said edge portions of said blade from an intermediate portion, and said horn portions cooperate to form said inner surface receiving said second portion of said plies.

* * * * *